United States Patent
Chien

(10) Patent No.: US 9,010,986 B2
(45) Date of Patent: *Apr. 21, 2015

(54) DEVICE HAVING BUILT-IN DIGITAL DATA DEVICE FOR LED BULB

(71) Applicant: Tseng-Lu Chien, Walnut, CA (US)

(72) Inventor: Tseng-Lu Chien, Walnut, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/049,427

(22) Filed: Oct. 9, 2013

(65) Prior Publication Data

US 2014/0139120 A1 May 22, 2014

Related U.S. Application Data

(63) Continuation of application No. 13/296,508, filed on Nov. 15, 2011, now Pat. No. 8,562,158.

(51) Int. Cl.
*H05B 37/02* (2006.01)
*F21V 19/00* (2006.01)
*G03B 15/03* (2006.01)

(52) U.S. Cl.
CPC .......... *H05B 37/0245* (2013.01); *F21V 19/003* (2013.01); *F21V 19/0015* (2013.01); *G03B 15/03* (2013.01); *H05B 37/0218* (2013.01); *H05B 37/0236* (2013.01); *F21V 19/00* (2013.01); *Y02B 20/42* (2013.01)

(58) Field of Classification Search
CPC ... F21V 19/00; F21V 19/0015; F21V 19/003; H05B 37/0218; H05B 37/0236; H05B 37/0245; G03B 15/03
USPC ............. 362/640–642, 647, 650, 3, 4, 8, 253, 362/276, 802; 348/143, 151, 152, 155, 370, 348/373–375, 12
See application file for complete search history.

(56) References Cited

U.S. PATENT DOCUMENTS

| 6,686,952 B1* | 2/2004 | Brazier | 348/143 |
| 6,812,970 B1* | 11/2004 | McBride | 348/372 |
| 2010/0321498 A1* | 12/2010 | Kao | 348/151 |

* cited by examiner

*Primary Examiner* — Thomas M Sember
(74) *Attorney, Agent, or Firm* — Bacon & Thomas, PLLC

(57) ABSTRACT

A device having built-in digital data means is powered by an unlimited power source for a lamp-holder, LED bulb, light device connected to unlimited power source by prongs or a base that can be inserted into a socket that would otherwise receiving a bulb. The device may take the form of a webcam having auto tracking functions and retractable prongs that plug directly into a wall outlet.

9 Claims, 11 Drawing Sheets

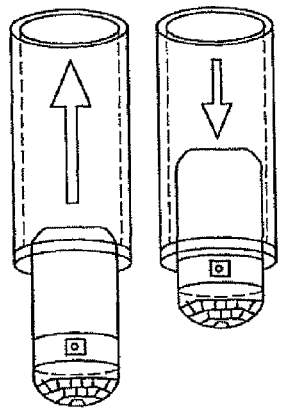
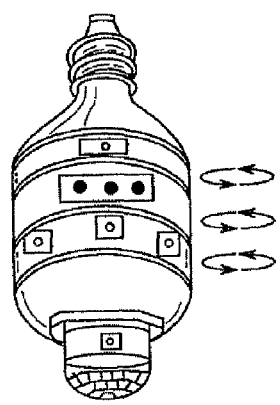
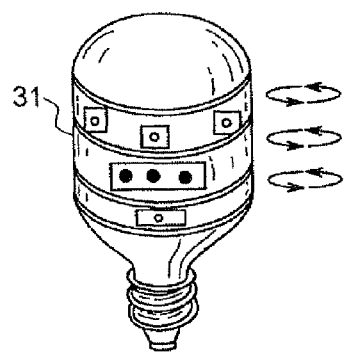
Fig. 3A  Fig. 3B  Fig. 4A
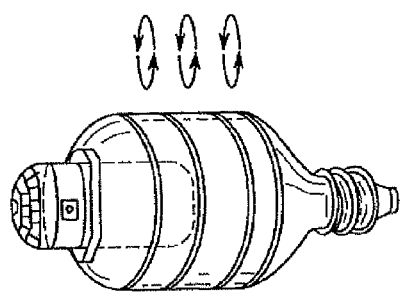
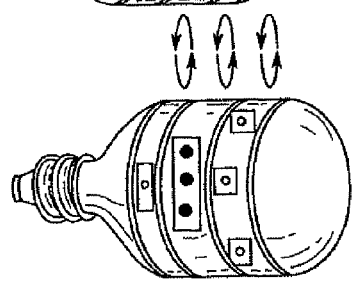
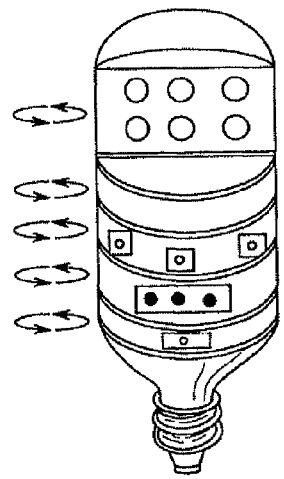
Fig. 3C
Fig. 4C  Fig. 4B

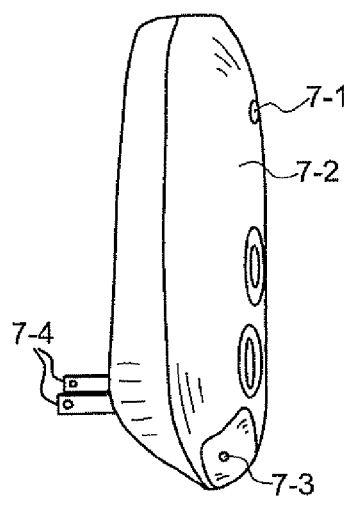
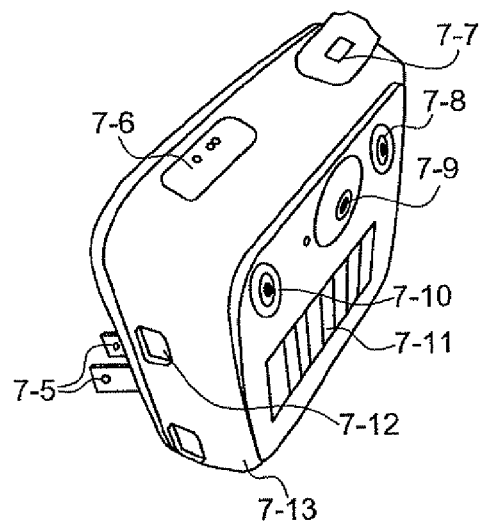
Fig. 7A
Fig. 7B
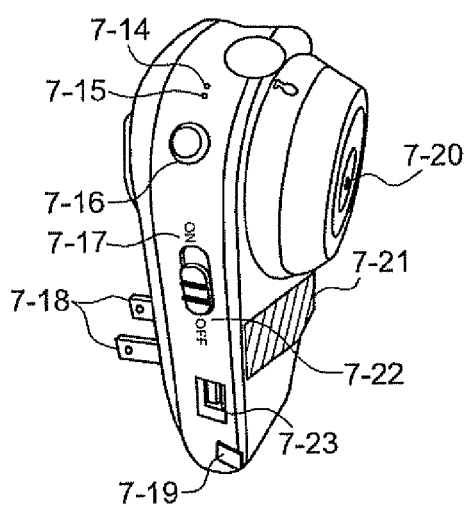
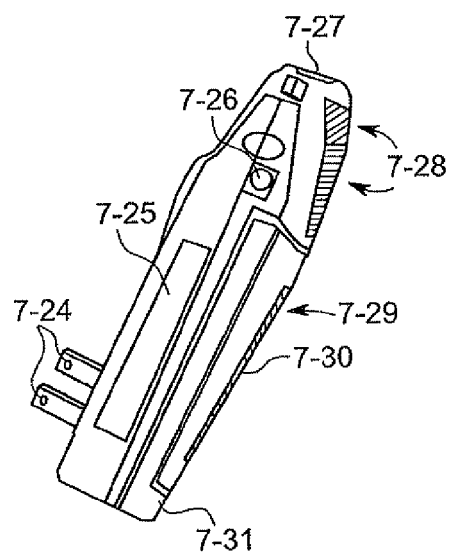
Fig. 7C
Fig. 7D

DEVICE HAVING BUILT-IN DIGITAL DATA DEVICE FOR LED BULB

This application is a continuation of U.S. patent application Ser. No. 13/296,508, filed Nov. 15, 2011.

This application has subject matter in common with the inventor's U.S. patent application Ser. Nos. 12/624,621, 12/622,100, 12/318,471, 12/318,470, 12/318,473, 12/292,153, 12/232,505, 12/232,035, 12/149,963, 12/149,964, 12/073,095, 12/073,889, 12/007,076, 12/003,691, 12/003,809, 11/806,711, 11/806,285, 11/806,284, 11/566,322, 11/527,628, 11/527,629, 11/498,874, 12/545,992, 12/806,711, 12/806,285, 12/806,284, 12/566,322, 12/527,628, 12/527,629, 12/527,631, 12/502,661, 11/498,881, 11/255,981, 11/184,771, 11/152,063, 11/094,215, 11/092,742, 11/092,741, 11/094,215, 11/094,156, 11/094,155, 10/954,189, 10/902,123, 10/883,719, 10/883,747, 10/341,519, 12/545,992, 12/292,580, 12/710,918, 12/624,621, 12/622,000, 12/318,471, 12/318,470, 12/318,473, 12/292,153, 12/710,561, 12/710,918, 12/711,456, 12/771,003, and 12/951,501.

BACKGROUND OF THE INVENTION

Of particular relevance are the inventor's U.S. patent application Ser. No. 13/296,469, filed on Nov. 15, 2011 and directed to a device having built-in digital data means and powered by an unlimited power source for a lamp holder, and Ser. No. 13/295,301, also filed on Nov. 15, 2011 and directed to a device having built-in digital data means and powered by an unlimited power source for a light device.

Also of particular relevance are the inventor's U.S. patent application Ser. No. 11/806,285, which discloses an LED night light having multiple functions, and Ser. No. 12/951,501, which discloses a lamp holder having a built-in LED light.

The current invention involves an LED light, which may be in the form of a night light, bulb, lamp holder, or other LED illumination device, and which has built-in digital device(s) with digital data record, storage, and display functions for digital sound, messages, photos, movies, films, audio, video, etc.

Current home security products available in the marketplace, and especially wireless home security products, are very expensive. Furthermore, not only are they too costly, they are also too much trouble to install (may need engineer to help) and the batteries or power storage means must be replaced very often.

To solve the problem of frequent battery or storage means replacement, the current invention utilizes an unlimited power source provided by an alternating current (AC) electrical outlet into which built-in prong means are plugged or to which a screw base is connected, and includes circuit means converting the AC power to direct current (DC) power.

In addition, the current invention incorporates a low cost, super compact Digital Video (DV) device (hereafter as DV), which is built-into the said LED light to solve the problems of high cost and difficult installation, eliminating the need to hire professional engineers at high cost per hours and saving wasted time in waiting for an installation appointment. The current invention can transmit digital data from the digital camera to the display unit while receiving unlimited power directly from built-in prong means in the DV camera or from a screw base connected with an AC power source with circuit means to provide unlimited DC power.

The current invention preferably also provides a DV device having a camera and display screen in one unit so that there is no need for transmission by wireless means.

Because the DV camera is built into the unlimited power device, and may including an LED light, LED bulb, lamp holder, or other LED illumination device), the invention offers excellent home security. One advantage is that a bad man into and cannot easily find the DV camera from among a variety of device(s) such as lamp holders on the wall or ceiling, offering the best safety record to protect home and family at any time.

In a preferred embodiment of the current invention, the DV camera can include an endless recording that overwrites past digital data so that it will always update new data without the need to change any storage means, so long as the initial installation is selected for certain hours of recording and certain minutes for the storage section.

The preferred DV device may have the most advanced technical features and functions available from the marketplace, which may include any combination of a (F1) wide Angle or telescope lens assembly and fine pixel/HD (1280×720 Pixel)/VGA (720×480 pixels)/good display screen (320×240 pixels) with a light weight, rechargeable batteries, and anywhere from 1.3M up to 12M or more pixels to provide VGS or HD video or ISO selection; (F2) auto focus/tilt/rotating/moving/scan functions; (F3) a motion sensor by PIR means; (F4) a motion sensor by screen detection; (F5) a night vision selection; (F6) auto power shut-off; (F7) power saving; (F8) built-in screen; (F9) USB means for data delivery; (F10) remote control means; (F11) wireless data transfer to a remote cellular phone/computer/communication device(s); (F12) auto dialing to a police station; (F13) auto tracking of moving object(s) from ants to elephants or other live objects; (F14) other light means/device(s); (F15) other wireless/remote/IR sensor/PIR sensor/motor(s) features; (F16) any other electric or mechanical functions available from the marketplace for a digital camera or digital video recorder. Any or all such features may be selected and incorporated with the preferred DV device to make sure people can see, know, and watch the desired site/events at any location/place/time.

The DV device may have a plurality of cameras to provide multiple images that can be shown on a screen so as to monitor multiple areas. It will also be appreciated that the DV device can incorporate an IC chip and related circuitry, motor-means, and a motion-sensor with more than one sensor heads to allow a single camera head with auto tracking functions to follow moving objects.

A preferred embodiment of the built-in DV device of the current invention includes an LED bulb and lamp holder to provide an LED Bulb, night light, or security light which has prong-means or socket-means to connect to an unlimited power source which directly supplies current, or to a rechargeable power storage-means such as a rechargeable battery, and which does not require any other separate means such as wire(s), adaptor(s), or transformer(s) to deliver electricity from the unlimited power source to the LED device and built-in digital data device. Furthermore, the unlimited power source may use prong means, a socket base lamp holder, and conductive means which do not have a male-female connector construction on the device housing, or a USB-cable that directly comes out of the device housing, or a regular 120 Volt 60 Hz plug wire that directly comes out of the device housing and connects with the public electricity system for home, house, and public areas. One of the best applications for the current invention is as a webcam that can be used for all kinds of computer, laptop, phone, or communication equipment. Conventional webcams are limited in that they cannot follow moving people or objects so people have to sit in front of the webcam to talk with people. The embodiment of the current invention that provides a USB-cabled LED Bulb with a camera head having an auto tracking assembly will make an excellent auto-tracking webcam to let people freely move while talking with other parties.

Another preferred feature is to include foldable or retractable prongs so that the device can be carried anywhere. The current invention may have different constructions that provide an LED night light with a built-in digital data device capable of being moved and used anywhere, including a car, motorcycle, boat, bus, truck, or other transportation equipment available in the marketplace so long as the foldable or push-in/push-out prong-means is incorporated with a proper receiving-means and adaptor-means to connect with a transportation cigarette lighter device.

Furthermore, the DV may have a variety of functions, parts, and accessories to get desired functions. The DV device parts and accessories may be selected from different camera heads, kits, lenses, optics means, assembly night vision means, means for detecting motion by image screen or motion sensor, vibration sensors, sound sensors, storage means, SD cards, Mini SD cards, memory sticks, memory means, operation functions, power saving circuits, screen touch panels, exposure means, and/or motor means, as well as means for adjusting or selecting clearance, pixels, sharpness, ASA, and so forth.

Another preferred embodiment of the DV device of the current invention is to add the DV device to a lamp holder and LED bulb. A majority of LED lights and lamp holders are installed at a position which is higher than people's height, so that they will easily record moving objects without any objects blocking the camera shooting directions. Furthermore, the current invention not only can provide an LED bulb or lamp holder with a DV, but also a night light that incorporates a wider angle camera lens so that it can look for moving objects from an unnoticeable position. The current invention also can apply more than one camera head with a divided image on screen to save cost or use only one camera head that incorporates more than one sensor-means and an IC circuit to calculate a position or orientation difference to delivery electric signals to a motor-means to move the camera head toward a moving object and thereby provide an auto tracking camera. Still further, any equivalent or same function will still fall within the current invention and can be added to the preferred DV devices to provide nice, clear digital data and storage into a memory-means powered by an unlimited power source without causing worry about battery power or bad electric wire installation, unlike the conventional home security equipment.

In embodiments involving a lamp holder, insert means may be provided to connect with an original lamp holder's receiving means to change the lamp holder's current, functions, current type, voltage, and features, such as changing from AC to DC at a certain voltage and amperage, adding cameras and related parts and accessories, adding LED device current triggers, adding IC chips to operate desired functions, adding a tracking motor device, adding a sensor(s), adding remote control parts and accessories, adding an infrared nighttime vision function, adding memory means with related parts and accessories, adding display means, adding transmitter means to transfer digital data to a remote distance, adding auto dialing system, and adding an internet connect function or any other electric or mechanical functions based on market requirements.

The lamp holder may be selected from market-available items, and may hold one or more light means, including any of an incandescent, fluorescent tube, PL, or LED light for use with a variety of different bases, which may be in the form of a screw base, bayonet base, two pin base, twist base, or push and twist base. The lamp holder is connected with the unlimited power source when the lamp holder's insert means is connected with the original lamp holder receiving means so that the power can be obtained from the original lamp holder's unlimited power source.

The camera means incorporated with the lamp holder of this embodiment, like the camera means of any of other embodiment, can consist of desired parts and accessories including lenses, optics means, electric means, mechanical means, circuit means, integrated circuit (IC) means, data delivery means, data storage means, USB means, cable means, microphone means, record means, display means, sensor means, PIR means, IR means, night vision means, flash means, switch means, motion detect means, sound detect means, photo sensor means, motor means, tracking means or other market available parts and accessories to allow people to get digital image, video, and audio data and record it in memory means or send/transmit the data to a communication device, computer device, receiver device, and/or display device to provide predetermined functions, effects, and performance.

According to another preferred embodiment, an LED bulb means includes a plurality of LED-units that fit within a bulb housing having an appropriate shape and dimensions, and positive and negative electric contracts to get power from the power source when the electric-contacts connect with the power source and the power source is thereby connected with the desired electric parts and accessories, which may include circuit means, IC means, conductive means, switch means, sensor means, remote control means, IR means or other electric or mechanical means to cause the LED-unit(s) and the camera means to be activated with the LED bulb and its added parts and accessories displaying the above-mentioned predetermined function(s) and performance(s).

The LED bulb has space to install the camera means on its housing by using or together with any of the following: joint-means, rotating means, connect-means, spin-means, catch-means, a gear-set, a motor set, control means, IC means, sensor head(s), a tracking assembly, memory assembly means, display means, screen means, USB means, conductive means, digital data delivery means, battery means, rechargeable battery means, power fail means, or other means to provide the camera means built-into the LED Bulb to have desired functions, features, and performance.

The space in the LED bulb may include a pole(s), block(s), piece(s), and/or compartment(s) having properties that cause the bulb or space to be extendable, retractable, foldable, rotatable, and/or transformable so that the related parts and accessories can be installed within.

The camera means may be turned-on and turned-off by sensor means, a PIR sensor head, more than one sensor head (s), remote control means, switch means, motion detection means, vibration detection means, heat sensor means, and/or smoke detector means, so as to take photos, video, and audio and provide colorful, clear, and sharp digital data to be saved in storage means, shown on a screen, shown on a wireless screen, shown on a monitor(s), or transmitted to a communication device, computer device, Internet device, or auto dialing device.

The LED-units, camera means, sensor means, remote control means, moving LEDs, moving sensor means, moving camera means, motion detection means, heat detection means, smoke detector means, motor means, auto tracking assembly, and so forth can be installed on a fixed housing, moving housing, or extendable housing, so as to provide a desired sensor range, distance, and angle with a variety of selection options for the camera's pixels, focus range, and/or pictures per second, for video/movie and sound/audio upon activation of the camera means to shoot and store the digital data into the memory means, communication device, computer device, consumer electric device, screen, or monitor(s).

Finally, the LED Bulb may also take the form of an EL or LED Bulb selected from market available LED Bulbs such as a night light, desk lamp, floor lamp, down light, ceiling light, track light, security light, projection light, outdoor light, indoor light, LED light fixture, LED light bar, LED picture light, LED closet light, LED door light, LED garage light, LED motion sensor light, LED power failure light, LED motion sensor with auto tracking means, LED patio light, or any other LED Bulb available from the marketplace.

BRIEF DESCRIPTION OF THE DRAWINGS

FIGS. 3A, 3B, 3C, 4A, 4B, and 4C show a third embodiment of the current invention in the form of an LED bulb.

FIGS. 7A, 7B, 7C, and 7D show another embodiment of the current invention in the form of a light device having built-in digital data means and powered by an unlimited power source.

DETAILED DESCRIPTION OF THE PREFERRED EMBODIMENTS

Figure 1A:
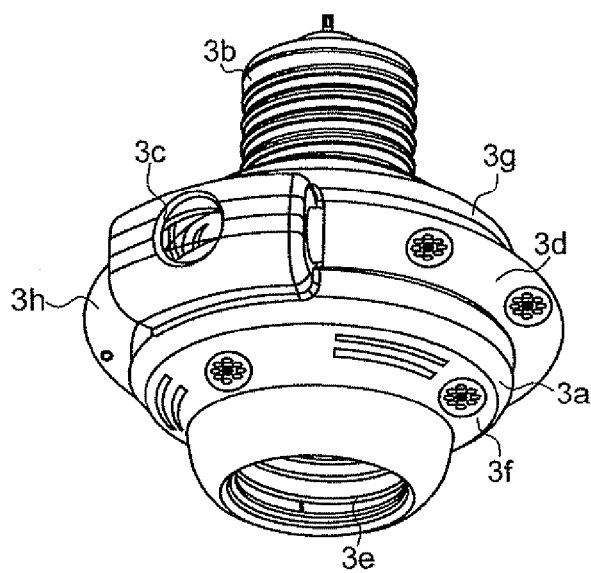
FIGS. 1A, 1B, and 1C show a lamp holder according to a first preferred embodiment of the current invention.
Figure 1B:
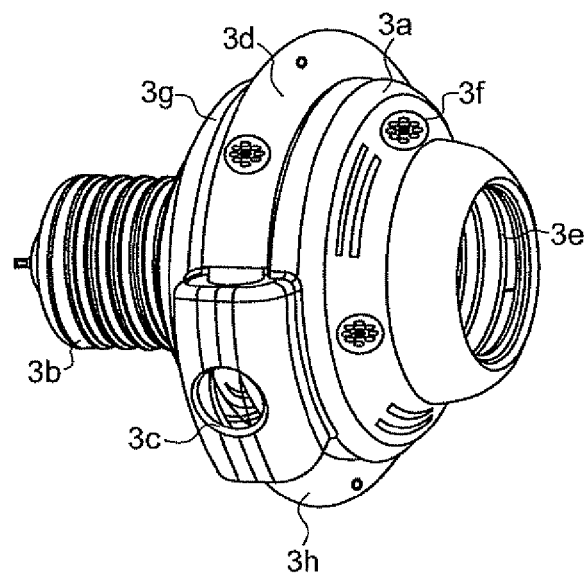
Figure 1C:
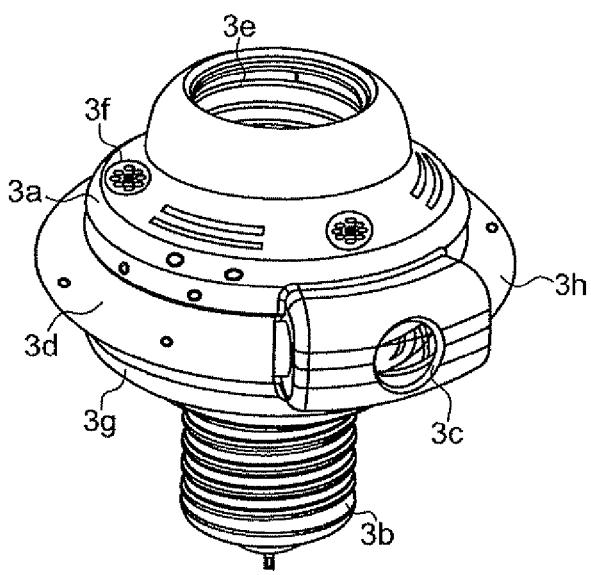

The invention is a device having digital data means that is powered by an unlimited power source and built-into a lamp holder, LED bulb, or light device. The following description was included as notes in the original drawings, and are now included herein:

FIGS. 1A-1C show a device in the form of a light fixture insert 3d with a screw-in base 3b and a built-in camera head 3f that can be screwed into an existing light fixture to add digital camera functions, with power being supplied through an elastic terminal at the top of the light fixture insert when the insert is screwed into the existing light fixture. The insert includes a socket 3e into which a bulb may be screwed to receive power from an unlimited power source through the insert base 3b. A sensor 3c and IC are provided to control movement of the camera. By replacing a conventional bulb in the existing light fixture with the illustrated insert 3d, a security camera can easily be installed without the need for expert installation. When the bulb is then screwed into the socket, the resulting installation will look like an ordinary light fixture and therefore bad guys will not notice the camera. The camera can include night vision or infrared capabilities, and tracking features, and the insert may be waterproof to protect the camera and electronics. The bulb may be an incandescent bulb, or another type of bulb such as an LED bulb. When the light bulb faces downward, the camera or night vision camera preferably also faces downward, and when the light bulb faces frontwards, the camera or night vision camera also preferably faces frontwards. In some applications, the light fixture may be part of a waterproof installation in which the camera or sensor faces upwards.

Figure 2A:
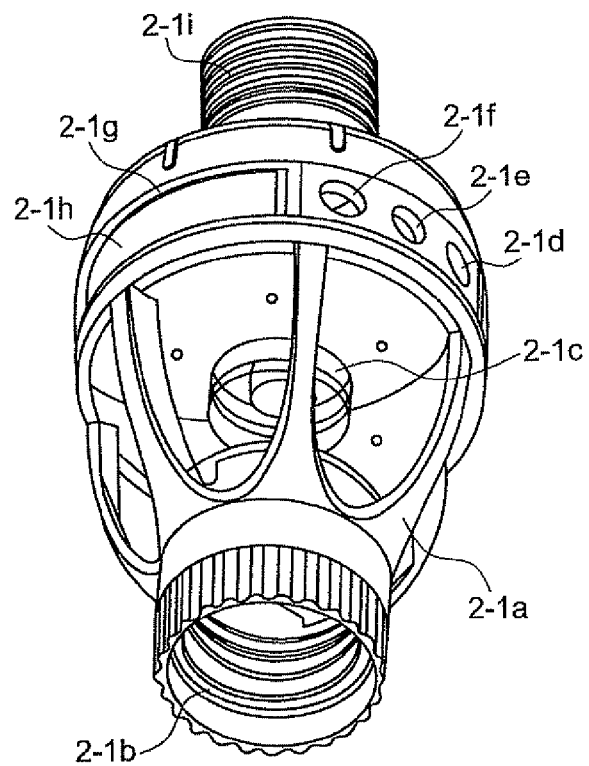
FIGS. 2A and 2B shows a lamp holder of a second preferred embodiment.
Figure 2B:
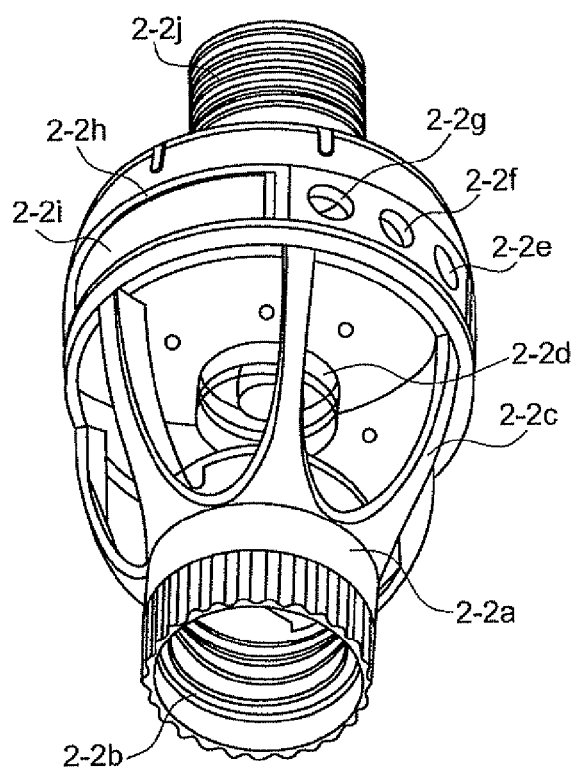
Figure 3E:
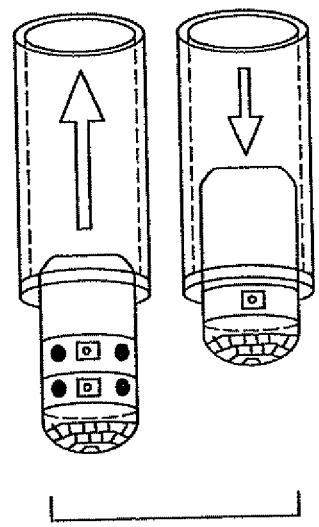
FIGS. 3D and 3E show a fourth preferred embodiment of the current invention, also in the form of an LED bulb.
Figure 3D:
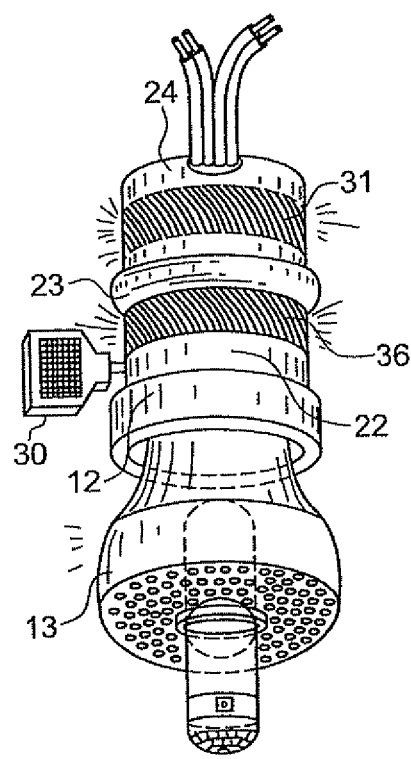
Figure 5A:
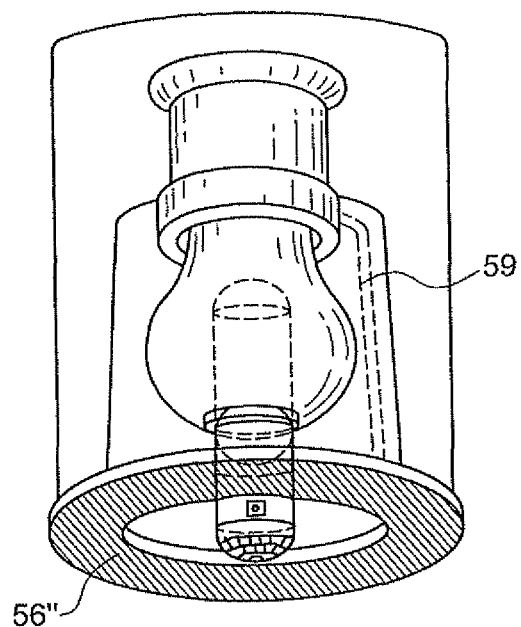
FIGS. 5A 5B, 5C, and 5D show another embodiment of the invention in the form of an LED bulb
Figure 5B:
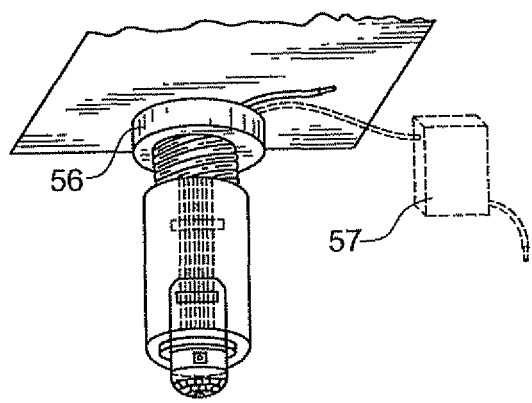
Figure 5C:
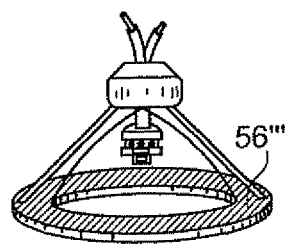
Figure 5D:
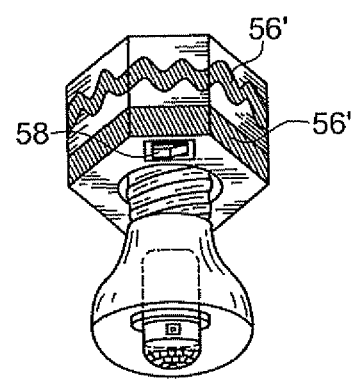
Figure 6A:
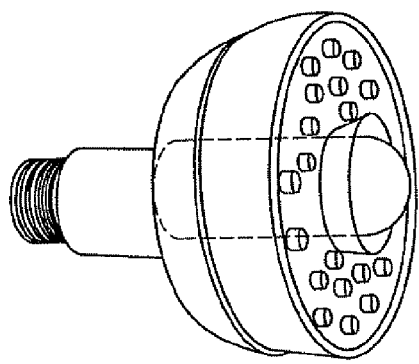
FIGS. 6A, 6B, 6C, 6D show a variety of different LED bulb designs which can have built-in digital data means and be powered by an unlimited power source according to the current invention.
Figure 6B:
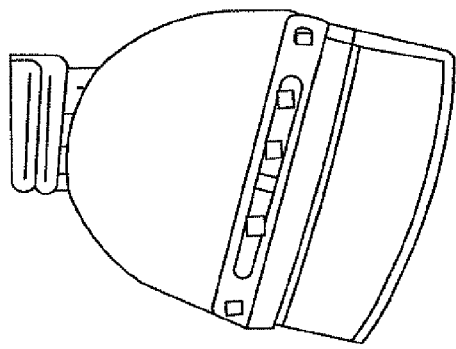
Figure 6C:
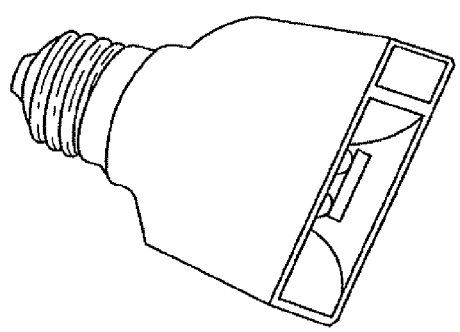
Figure 6D:
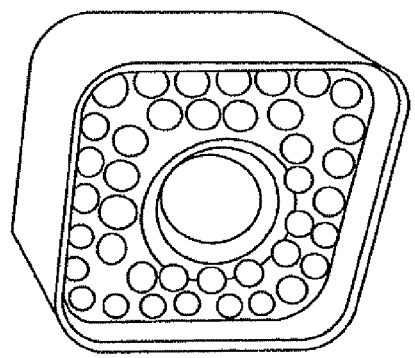

FIGS. 2A and 2B show an arrangement similar to that of FIGS. 1A-1C. In the arrangements of FIGS. 2A and 2B, like that of FIGS. 1A-1C, the camera preferably faces downward from a ceiling installation, and the motion sensor or sensor-assembly causes the camera to start recording in response to detection of motion in the field of view, with optional transmission of the captured data to a computer or phone. As shown in FIGS. 3A-3E and 4A-4C, the sensors and/or camera can be extended or retracted and rotated to avoid interference by lamp shades, lamp covers, lamp walls, or other blocking means that otherwise might block a field of view of the camera or sensor. The device may have multiple rings, each of which is separately rotatable to enable separate rotation of the sensor(s) and difference camera heads, as shown in FIGS. 3B, 3C, 3E, and 4A-4C. As shown in FIGS. 3A-3E, 4A-4C, and FIGS. 5A-5D, the extension may enable the position, orientation, or angle of the sensor or camera head to be varied, or enable the sensor to be extended while the lighting feature is within a shade, and the device may further include external light elements such as lighting elements 31 and 36, as well as additional sensors such as sensor 30. As shown in FIGS. 5A-5D, additional lighting elements such as panels or strips 56,56',56" may be provided on the lighting fixture and connected to the main power source by conductors 59, the additional lighting elements and/or the sensor or camera head being controlled by, for example, a switch 58 or circuitry 57 external to the fixture. As shown in FIGS. 6A-6D, a variety of LED bulbs may be inserted into the device. In each of the embodiments that permit extension and/or rotation, the extension or rotation may be carried out by a gear set and motor, and may be responsive to an auto tracking means to follow movements.

FIGS. 7A-7D show digital video webcam devices with built-in prong means to connect the webcam directly to an unlimited power source such as a wall outlet, and sensors that can be used to provide auto tracking functions. It will be appreciated that the video webcam devices are conventional, except that they have been modified to include built-in prong means and various night or emergency lighting features. The webcam device of FIG. 7A may include an LED to serve as a night light as well as a webcam, while the webcam device of FIG. 7B includes foldable prong means 7-5, a power fail light 7-10 as well as a night light 7-11, switch 7-12, memory card slot 7-13, on/off switch 7-6, camera head 7-9, and USB adaptor 7-7. The device of FIG. 7C is a projection night light with foldable prong means 7-18, power switch 7-17, phot/video switch 7-16, indicator LEDs 7-14 and 7-15, camera head 7-20, night light 7-21, power switch 7-22, USB adaptor 7-23, and LED floor light 7-19. The device of FIG. 7D is a LED night light with a built-in emergency light function, including foldable prong means 7-24, a memory card and USB adaptor compartment 7-25, a power input 7-26, a camera head 7-27, an LED night light with emergency light function 7-28, an electroluminescent or LED night light area 7-29, a battery compartment 7-30, and a foldable compartment 7-31 for a screen select switch, model selection switch, and setting switch.

Figure 8A:
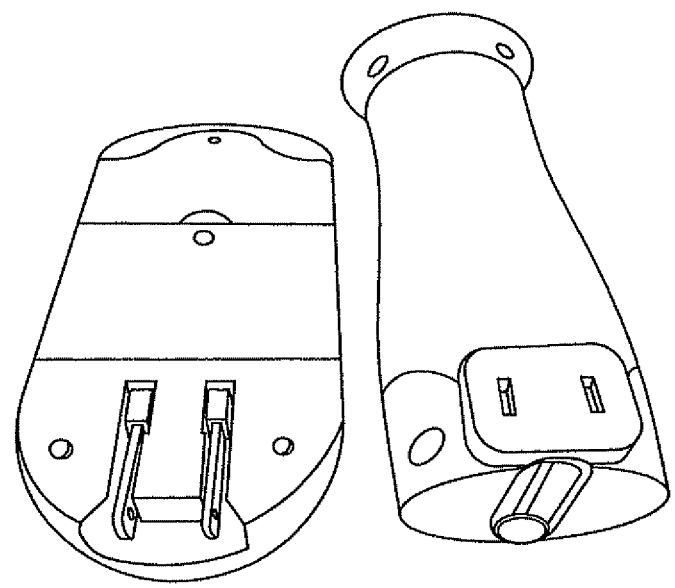
FIGS. 8A and 8B show a foldable or retractable prong means construction and details.
Figure 8B:
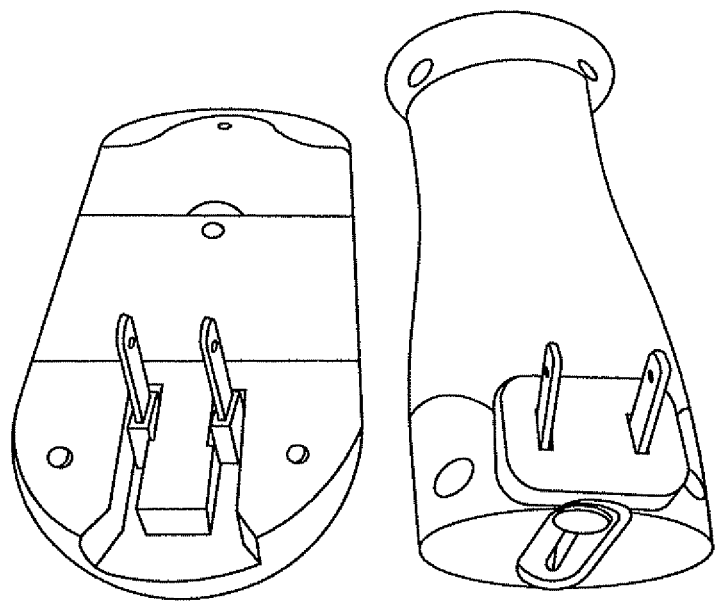

FIGS. 8a and 8b so devices with foldable or extendable prongs. In FIG. 8a, the prongs are folded or retracted and cannot be used, while in FIG. 8b, the prongs are extended for use.

Figure 9A:
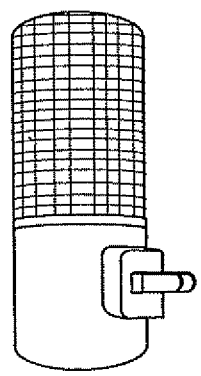
FIGS. 9A, 9B, 9C, 9D, 9E, and 9F illustrate a size comparison for a traditional LED night light versus a plurality of market-available Digital Video/Camera units.
Figure 9B:
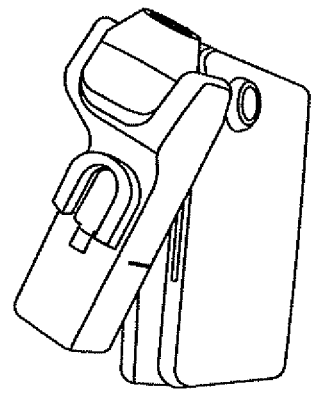
Figure 9C:
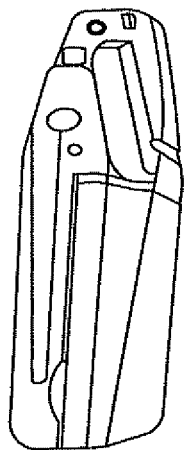
Figure 9D:
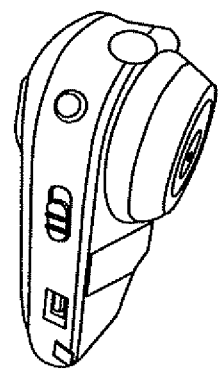
Figure 9E:
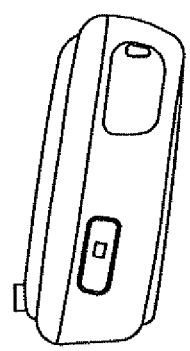
Figure 9F:
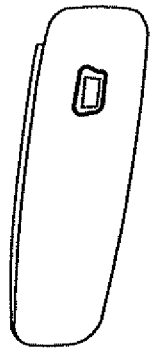

FIG. 9b shows a typical night light, while FIG. 9b shows a device with multiple camera heads, which can easily fit within the approximate dimensions of the night light. FIG. 9c shows a night vision digital video device with a motion sensor that can be upgraded for auto tracking. FIGS. 9d-9f show extra small and slim digital recording devices that can be incorporated into a lighting device according to the principles of the invention.

Figure 10A:
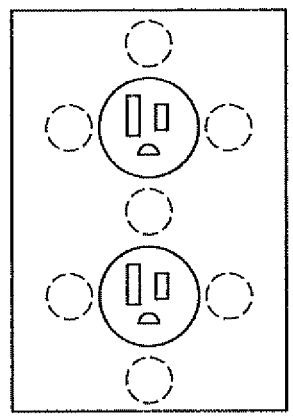
FIGS. 10a and 10b show an embodiment of the current invention which uses a plurality of suction cups to reinforce the prong means and hold a super heavy device on a wall outlet cover plate.
Figure 10B:
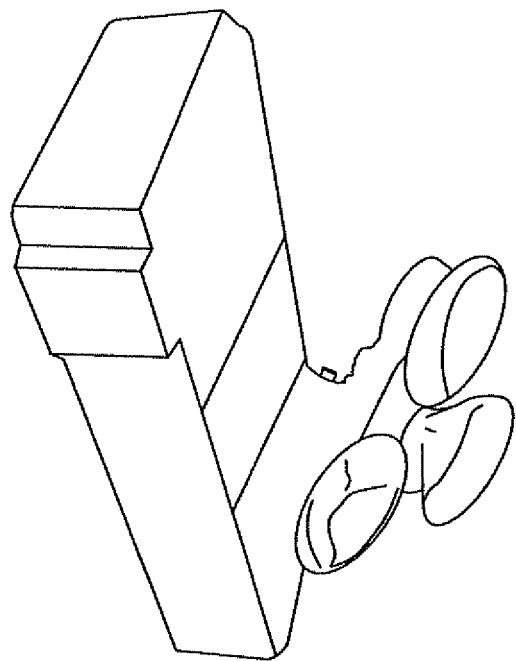
Figure 11A:
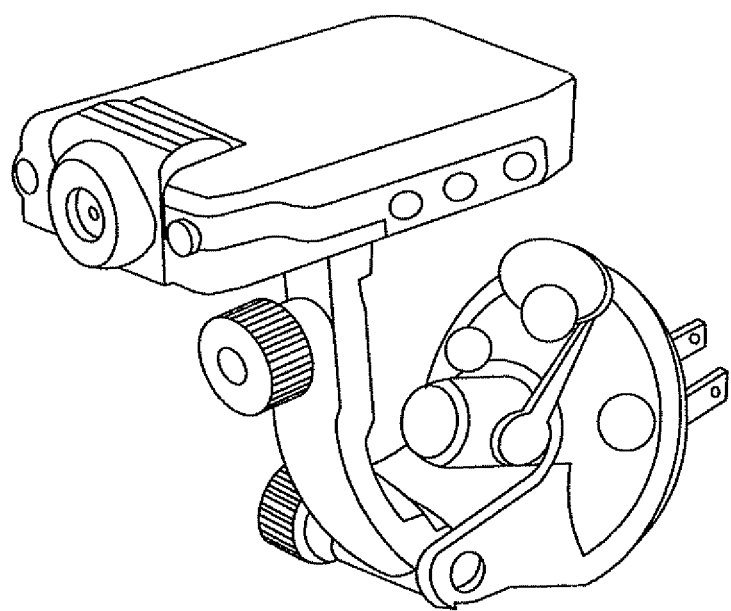
FIGS. 11a and 11b show another embodiment with a plurality of suction cups.
Figure 11B:
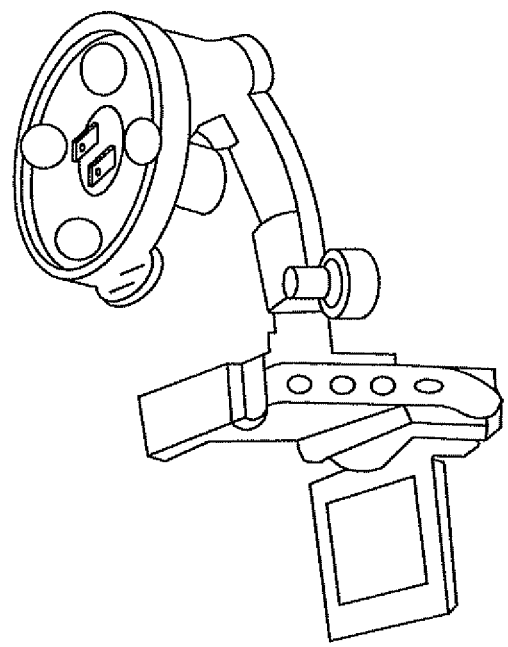

FIG. 10A shows the location where suction cups, shown in FIG. 10B, may be used to adhere to an outlet cover plate and support the extra weight of the combined DV device and lighting fixture when directly plugged into a wall outlet. FIGS. 11A and 11B show alternative DV devices arranged, according to the principles of the invention, to be plugged into a wall outlet and to be supported, as necessary, by additional suction cups.

In summary, the invention provides a device having a built-in digital data device powered by an unlimited power source that supplies unlimited power to the device, the digital data device including at least one camera having means for capturing images, data, or sound at a desired shooting angle, resolution, color, brightness, and sharpness, and at least one of a means for storing the images, data, or sound into a memory and means for transmitting the images, data, or sound to at least one of a communication device, computer device, phone, receiver device, and display device, the digital data device further including components selected from lenses, optical components, electrical components, mechanical components, circuitry, an integrated circuit (IC), data delivery means, data storage means, a USB port, a cable, a microphone, record means, display means, sensor means, PIR means, IR means, night vision means, flash means, a switch means, motion detect means, sound detect means, a photo sensor, a motor, and tracking means. The LED Bulb includes a housing and means for emitting light beams, and is supplied with power from the power source by circuitry including at least one of a controller, switch, sensor, conductors, integrated circuit, remote controller, and wireless communication means, The LED Bulb may be selected from a night light, desk lamp, floor lamp, down light, ceiling light, track light, security light, projection light, outdoor light, indoor light, LED light fixture, LED light bar, LED picture light, LED closet light, LED door light, LED garage light, LED motion sensor light, LED power failure light, LED light with auto tracking, LED patio light, and LED Bulb, and may be connected with the power source by prongs, a conductive wire with a plug extending from the LED Bulb, a USB adaptor, a transformer device, and an inductor device, without the need for a female-male connector.

In a preferred embodiment, as illustrated in FIGS. 1A-1C and 2A-2B, the device is in the form of an insert forming a lamp holder with a socket having desired lamp socket specifications, said insert being arranged to be inserted into an existing light fixture.

Preferably, the LED bulb may have multiple functions in addition to a lighting function, and may include a compartment for extendably, retractably, foldably, or transformably installing accessories that provide more than one function.

The digital data means include sensor means having more than one sensor head and an integrated circuit for controlling an auto tracking assembly that enables the camera to track moving objects or persons, and/or may include multiple cameras for capturing images of different locations.

The unlimited power source may be an electrical utility power supply system for supplying electricity to homes, residences, and businesses.

The invention also provides a webcam having an auto tracking means and power supply connected to an unlimited power source to a USB interface, the webcam including at least one camera head having means for capturing images, data, or sound at a desired shooting angle, resolution, color, brightness, and sharpness, a motor, and sensor means for causing the move the camera head to follow a moving object or person, and means for storing or transmitting data captured by the camera head to one of a display, computer, communication device, phone, Internet, website, e-mail, or auto dialing system. The webcam may include a USB adaptor for connection to a computer or communication equipment with a USB port, with the webcam being activated when connected with the power source to carry out predetermined image capture functions and to capture digital data under predetermined environmental conditions.

The webcam may include suction cups for mounting the webcam to a computer screen or housing, and multiple camera heads for simultaneously viewing multiple areas, as well as a lighting device or devices having additional functions.

The webcam preferably further includes prong means for directly plugging the webcam into an electrical outlet, and weight supporting means for supporting the webcam on the outlet, said weight supporting means including at least one of the following: at least one suction cup, glue, double-sided tape, a hook and loop fastener, an adhesive, a chemical compound, a connector, an adaptor, and a fitting means, and may be arranged to operate at night or in low light.

The invention claimed is:

1. A digital device arranged to fit within a light socket in place of a light device, said digital device including a bulb housing containing both a digital data device and at least one lighting unit, said bulb housing including an extension that is removably inserted into said light socket so that said lighting unit and digital data device are supplied with power from an unlimited power source of the light socket, wherein:

said digital data device includes at least one camera having means for capturing images, data, or sound at a desired shooting angle, resolution, color, brightness, and sharpness, and at least one of a means for storing the images, data, or sound into a memory and means for wirelessly transmitting the images, data, or sound to at least one of a communication device, computer device, phone, receiver device, and display device, and said digital device is arranged to be inserted into said light socket such that said at least one lighting unit and digital data device are supplied with power from said unlimited power source through said light socket into which digital device is inserted, whereby said digital device provides both an lighting function and at least an additional function of said digital data device, said digital device thereby converting said light fixture into a multiple function device that includes both the additional function of the digital data device and the lighting function, both supplied with power from said unlimited power source.

2. A digital device as recited in claim 1, wherein said light fixture includes one of a screw socket, a bayonet socket, a socket arranged to receive a two-pin base, a socket arranged to receive a twist-type base, and a push-and-twist socket.

3. A digital device as recited in claim 1, further comprising circuitry for receiving electric current from said light fixture, converting said electric current into electric current for causing said at least one lighting unit to emit said light beams, and supplying said electric current to said digital data device.

4. A digital device as recited in claim 1, wherein said digital data means include sensor means having more than one sensor head and an integrated circuit for controlling an auto tracking assembly that enables the camera to track moving objects or persons.

5. A digital device as recited in claim 1, wherein said means for transmitting the images, data, or sound to at least one of a communication device, computer device, phone, receiver device, and display device includes means for e-mailing or transmitting said digital data to a sensor, remote control, or wireless receiver.

6. A digital device as recited in claim 1, wherein said camera includes an optics assembly having means for providing at least one of a desired focus, shooting angle, clarity, sharpness, color, distance, movement, tracking, identification, and resolution.

7. A digital device as recited in claim 1, wherein said unlimited power source is an electrical utility power supply system for supplying electricity to homes, residences, and businesses.

8. A digital device as recited in claim 1, where the digital data device further includes, within said bulb housing, sensing means for sensing motion, sound, light, vibrations, heat, or smoke, and wherein said digital data device is turned on or off by said sensing means.

9. An digital device as recited in claim 1, where the digital data device further includes, within said bulb housing, at least one of a tracking means for tracking an object and a camera moving means for extending, retracting, or rotating said camera; and additional digital data device components selected from a switch, a remote control receiver, lenses, optical components, electrical components, mechanical components, circuitry, an integrated circuit (IC), data communication and storage components, a USB port, a cable, a microphone, a display, a motor, and a battery or power fail device.

* * * * *